United States Patent
Kallmeyer et al.

(10) Patent No.: US 9,971,403 B1
(45) Date of Patent: May 15, 2018

(54) INTENTIONAL USER EXPERIENCE

(71) Applicant: Emergent AR Platforms Corp., San Mateo, CA (US)

(72) Inventors: Raymond Kallmeyer, San Mateo, CA (US); Andrew Warren Dawson, Palo Alto, CA (US)

(73) Assignee: Emergent AR Platforms Corp., San Mateo, CA (US)

( * ) Notice: Subject to any disclaimer, the term of this patent is extended or adjusted under 35 U.S.C. 154(b) by 0 days. days.

(21) Appl. No.: 15/811,607

(22) Filed: Nov. 13, 2017

Related U.S. Application Data

(63) Continuation of application No. 15/418,627, filed on Jan. 27, 2017, now Pat. No. 9,841,814.

(51) Int. Cl.
| | |
|---|---|
| *G09G 5/00* | (2006.01) |
| *G06F 3/01* | (2006.01) |
| *G06F 3/16* | (2006.01) |
| *G06T 7/73* | (2017.01) |
| *G06F 3/0481* | (2013.01) |
| *G06T 19/00* | (2011.01) |

(52) U.S. Cl.
CPC .......... *G06F 3/013* (2013.01); *G06F 3/04812* (2013.01); *G06F 3/167* (2013.01); *G06T 7/73* (2017.01); *G06T 19/006* (2013.01); *G06T 2200/24* (2013.01); *G06T 2207/30201* (2013.01)

(58) Field of Classification Search
CPC ......... G06F 3/013; G06F 3/017; G06F 3/0416
USPC .................................................... 345/8, 156
See application file for complete search history.

(56) References Cited

U.S. PATENT DOCUMENTS

| | | | |
|---|---|---|---|
| 8,660,679 B2 | 2/2014 | Kurabayashi et al. | |
| 9,841,814 B1 | 12/2017 | Kallmeyer et al. | |
| 2013/0050258 A1* | 2/2013 | Liu ...................... | G02B 27/017 345/633 |
| 2013/0127980 A1 | 5/2013 | Haddick et al. | |
| 2014/0108842 A1 | 4/2014 | Frank et al. | |
| 2014/0267004 A1* | 9/2014 | Brickner ................. | G06F 3/017 345/156 |
| 2014/0306875 A1* | 10/2014 | He .......................... | G06F 3/017 345/156 |
| 2016/0371886 A1 | 12/2016 | Thompson et al. | |

OTHER PUBLICATIONS

"International Search Report" and "Written Opinion of the International Searching Authority", Patent Cooperation Treaty Application No. PCT/US2018/014704, Feb. 14, 2018, 7 pages.

* cited by examiner

*Primary Examiner* — Calvin C Ma
(74) *Attorney, Agent, or Firm* — Carr & Ferrell LLP

(57) ABSTRACT

Methods for intentional user experience are provided herein. Exemplary methods include: getting point of interest data, including a location of a point of interest; receiving first user data, including a first location of the user and a first direction of a gaze of the user; calculating a first position of the gaze of the user using the first location of the user and the first direction of the gaze of the user; displaying a first indicator denoting the first position of the gaze of the user; receiving second user data, including a second location of the user and a second direction of a gaze of the user; calculating a second position of the gaze of the user using the second location of the user and the second direction of the gaze of the user; and displaying a second indicator denoting the second position of the gaze of the user.

21 Claims, 8 Drawing Sheets

INTENTIONAL USER EXPERIENCE

CROSS-REFERENCE TO RELATED APPLICATION

This application is a continuation of U.S. patent application Ser. No. 15/418,627, filed Jan. 27, 2017, and issued Dec. 12, 2017, as U.S. Pat. No. 9,841,814, the disclosure of which is hereby incorporated by reference for all purposes.

FIELD OF THE INVENTION

The present technology pertains to augmented reality, and more specifically to transforming sensory inputs in augmented reality.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Stereo displays present offset images that are displayed separately to the left and right eye. Both of these 2D offset images are then combined in a viewer's brain to give the perception of 3D depth.

SUMMARY OF THE INVENTION

Some embodiments of the present technology include methods for intentional user experience which may include: getting point of interest data, including a location of a point of interest in a real space; receiving first user data, including a first location of the user in the real space and a first direction of a gaze of the user, the first user data provided by at least one sensor of the augmented reality device; calculating a first position of the gaze of the user using the first location of the user in the real space and the first direction of the gaze of the user; displaying a first indicator denoting the first position of the gaze of the user using the first position of the gaze of the user; receiving second user data, including a second location of the user in the real space and a second direction of a gaze of the user, the second user data provided by the at least one sensor of the augmented reality device; calculating a second position of the gaze of the user using the second location of the user in the real space and the second direction of the gaze of the user; and displaying a second indicator denoting the second position of the gaze of the user.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
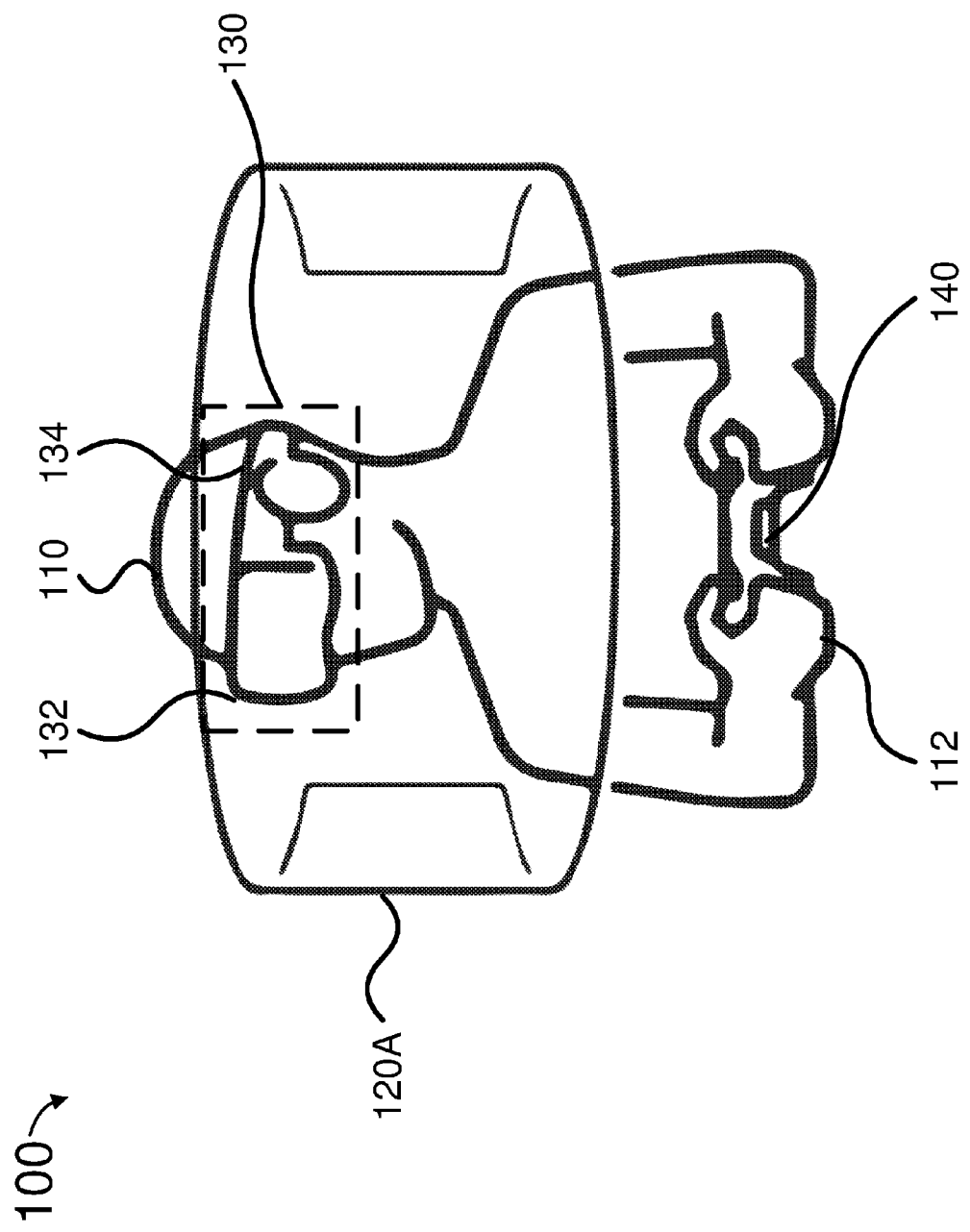
FIG. 1 illustrates an augmented reality system, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

According to the present technology, augmented reality (AR) is a (live) direct or indirect view of a physical, real-world environment (e.g., reality, real world, etc.) whose elements are augmented (or supplemented) by computer-generated sensory input such as sound, video, graphics, haptic feedback, and the like. AR can enhance users' (current) perception of their surroundings. For example, computer-provided sensory inputs to the user (e.g., images, sounds, and sensations) are overlaid on the real world. The computer-provided sensory inputs can be virtual and/or real (e.g., other real sensed or measured information).

FIG. 1 illustrates system 100 for augmented reality according to some embodiments. System 100 can include user 110, reality 120A, headset 130, and user input device 140. User 110 can have hand 112 (e.g., touch), two eyes (e.g., binocular vision), two ears (e.g., hearing), a nose (e.g., smell), and a mouth/tongue (e.g., taste) (not shown in FIG. 1). Reality 120A is a real-world environment (e.g., reality, real world, etc.) occupied by and surrounding user 110.

Headset 130 can be worn on the head of user 110 using a headband with optional adjustments. Headset 130 can include head-mounted display (HMD) 132 and stereo transducers 134. Generally, HMD 132 is placed in front of the eyes (not illustrated in FIG. 1) of user 110. By displaying two-dimensional (2D) offset images separately to the left and right eye of user 110, a brain (not depicted in FIG. 1) of user 110 can combine the offset images to give the perception of three-dimensional (3D) depth. HMD 132 can place images of both the physical world and virtual object(s) over a field of view of user 110. For example, HMD 132 can combine a view of reality 120A with a virtual object by projecting a computer generated image (CGI) through a partially reflective mirror and allowing user 110 to view reality 120A directly, sometimes referred to as optical see-through. By way of further non-limiting example, HMD 132 can combine a view of reality 120A with CGI electronically by accepting video from a camera (not shown in FIG. 1) and mixing it electronically with CGI, sometimes referred to as video see-through.

Generally, one of stereo transducers 134 can be provided to each ear (not illustrated in FIG. 1) of user 110. An independent audio channel can be provided to each of stereo transducers 134, such an impression of sound heard from various directions (like natural hearing) is created in user 110. Stereo transducers 134 can be headphones, earphones, in-ear headphones, and the like.

In various embodiments, headset 130 further includes various sensors, such as a camera, an accelerometer, a gyroscope, a Global Positioning System (GPS), a solid state compass, a haptic feedback device, microphone, an eye-tracking device (e.g., eye-attached, optical or video-based, and electrical-potential types) and the like (not shown in FIG. 1), singly and in combination. Headset 130 can also include a computing system as described in relation to FIG. 7.

User input device 140 can receive input from user 110, for example, to interact with virtual objects. For example, user input device 140 can be a gamepad, joystick, keyboard, keypad, glove controller, and the like. User input device can comprise various sensors, such as a switch, a camera, an accelerometer, a gyroscope, a GPS, a solid state compass, haptic feedback device, microphone, and the like, singly and in combination. User input device 140 can also provide sensory input to user 110, for example, using haptic feedback received by hand 112.

Figure 2:
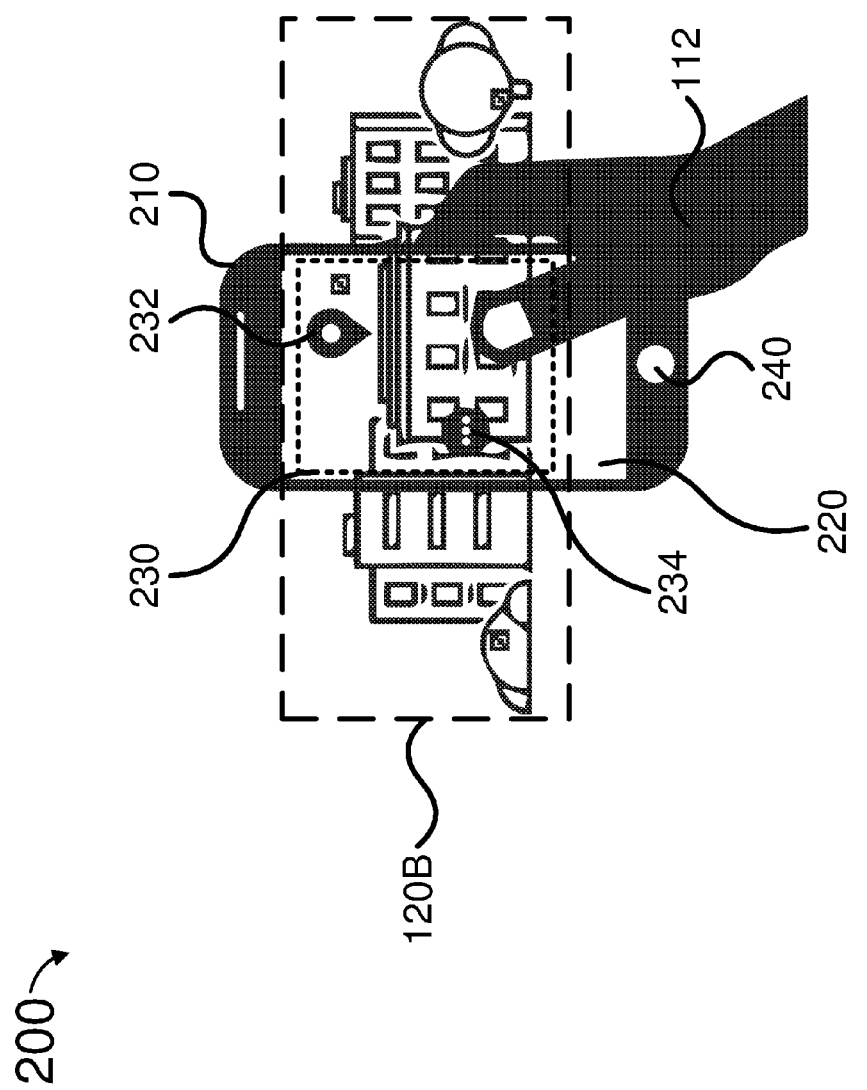
FIG. 2 illustrates an augmented reality system, according to various embodiments.

FIG. 2 depicts system 200 for augmented reality according to various embodiments. System 200 can include hand 112 (of user 110 in FIG. 1), reality 120B, and mobile computing device 210. Reality 120B is a real-world environment (e.g., reality, real world, etc.) occupied by and surrounding user 110 (FIG. 1; hand 112 shown in FIG. 2 is a part of user 110).

Mobile computing device 210 can include display 220. Display 220 can display a portion 230 of reality 120B. For example, a forward-facing camera (not shown in FIG. 2) of mobile computing device 210 can sense a portion of reality 120B in the camera's field of view and display the portion 230 in display 220. Display 220 can place images of both the physical world (e.g., portion 230) and virtual object(s) 232 and 234 (e.g., CGI).

In various embodiments, mobile computing device 210 further includes various sensors, such as a (forward- and/or backward-facing) camera, an accelerometer, a gyroscope, a GPS, a solid state compass, a haptic feedback device, one or more microphones, one or more speakers, and the like (not shown in FIG. 1), singly and in combination.

Mobile computing device 210 can receive input from user 110, for example, to interact with virtual objects. For example, mobile computing device 210 can receive input from hand 112 using display 220 (e.g., a touch screen). By way of further non-limiting example, mobile computing device 210 can receive input from hand 112 using one of more buttons/switches (e.g., switch 240). Mobile computing device 210 can also provide sensory input to user 110, for example, using haptic feedback received by hand 112. Mobile computing device 210 can be a computing system as described in relation to FIG. 7.

Figure 3A:
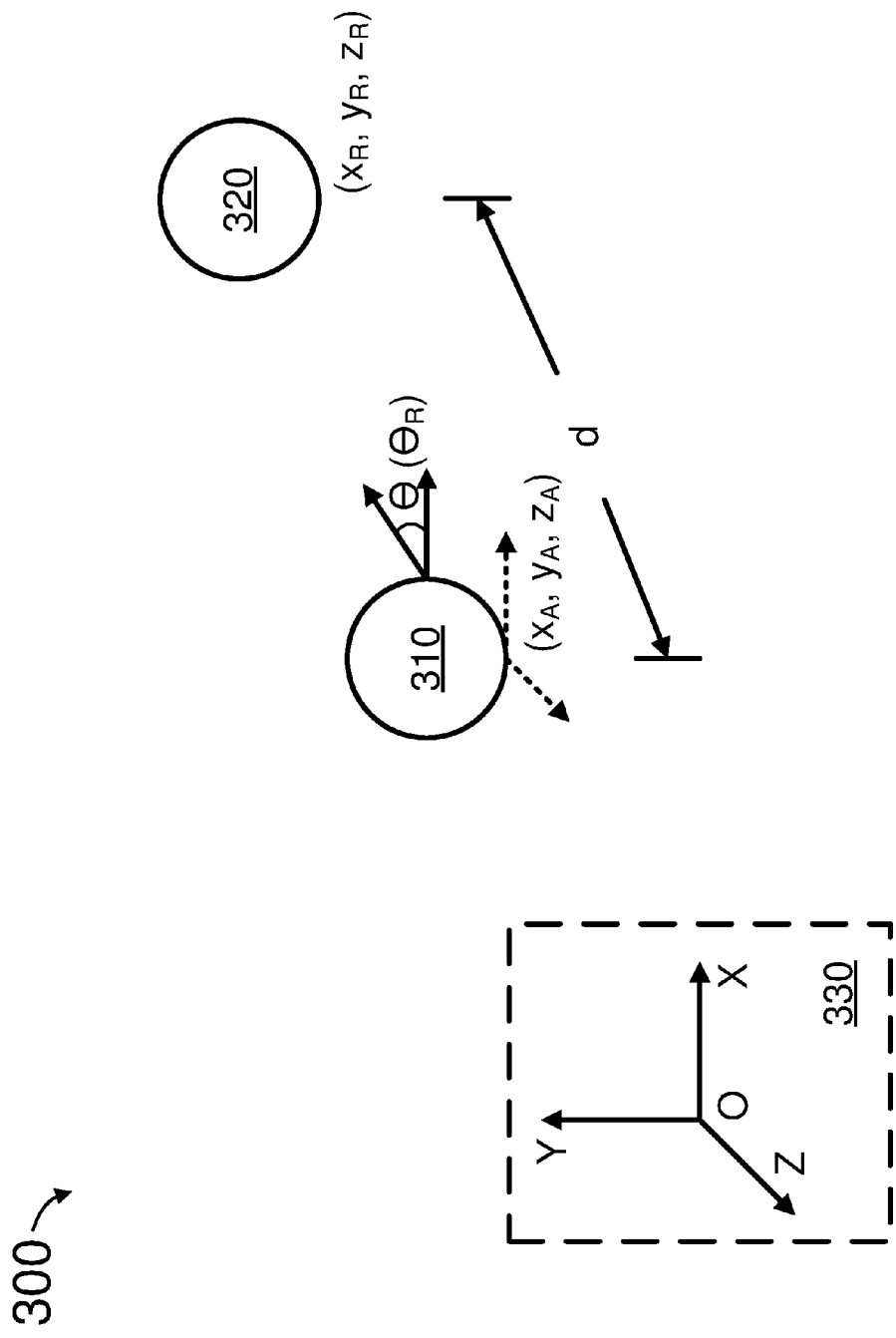
FIGS. 3A and 3B are simplified diagrams illustrating an environment, in accordance with some embodiments.

FIG. 3A shows environment 300, according to some embodiments. Environment 300 can include user 310 and point of interest (POI) 320. Environment 300 can be a real-world physical environment, virtual environment, and combinations thereof. User 310 can be a human being using an augmented reality system, such as described in relation to FIGS. 1 and 2. User 310 can also denote a part of a human being, such a head, eyes, hand, finger, and the like. POI 320 can be a real-world or virtual human being, other living being (e.g., animal, plant, etc.), object, text/label, and the like. At any time, each of user 310 and POI 320 can independently be in motion or at rest.

User 310 can be at a particular place or point in environment 300. In some embodiments, environment 300 is represented by a three-dimensional Euclidean space, a topological space (e.g., manifold), and the like. By way of non-limiting example, places or points in environment 300 can be uniquely identified or represented using a Cartesian coordinate system with (coordinate) axis 330. Although origin O of axis 330 is depicted in the lower left-hand corner of FIG. 3, origin O can be established at any point or place in environment 300.

User 310 can be at coordinates $(x_A, y_A, z_A)$ relative to origin O. POI 320 can be at coordinates $(x_R, y_R, z_R)$ which are relative to origin O, relative to coordinates $(x_A, y_A, z_A)$, or the like. POI 320 can be at a certain angle, pitch $\theta_R$, from user 310. For example, pitch $\theta$ is an inclination of an angle of a head and/or eyes of user 310, which indicates where user 310 is looking. Pitch $\theta$ is equal to $\theta_R$ when user 310 is looking at POI 320. Although depicted as one angle in one plane, $\theta$ and $\theta_R$ can each be short-hand for a set of three angles (e.g., one angle in each of three planes, such as the x-y, x-z, and y-z planes). Distance d is a distance between user 310 and POI 320. Distance d can be determined, for example, using the positions (e.g., (Cartesian) coordinates) of user 310 (e.g., $x_A, y_A, z_A$) and POI 320 (e.g., $x_R, y_R, z_R$). By way of further non-limiting example, each position is denoted by a set of Global Positioning System (GPS) coordinates.

Other coordinate systems can be used to uniquely identify a particular point or place in environment 300 (e.g., of user 310, POI 320, and the like), at any time. For example, polar coordinates are used. By way of further non-limiting example, GPS coordinates are used. The GPS is a global navigation satellite system that provides geolocation and time information to a GPS receiver in all weather conditions, anywhere on or near the Earth where there is an unobstructed line of sight to four or more GPS satellites. The GPS system operates independently of any telephonic or Internet reception, though these technologies can be used in conjunction with GPS positioning information.

In some embodiments, vectors can alternatively (or additionally) be used to describe volumes, regions, and the like instead of (or in addition to) points (e.g., coordinates). By way of non-limiting example, a state of user 310 (e.g., position, rotation, distance, and the like) is described using a set of vector functions in a time domain (e.g., a position of user 310 is $X(t)=<x\_1, x\_2, x\_3>$. In addition to static points, a vector representation can include past points (e.g., points earlier in time), regressions to calculate future points, derivatives of vector functions (e.g., to determine velocity, acceleration, jerk, jounce, angular versions thereof, etc.), compositions of state functions, and the like. Moreover, machine learning techniques, such as using vector functions as inputs to a training algorithm, may also be used. For example, vectors are provided to classifiers for decision-making purposes.

Figure 3B:
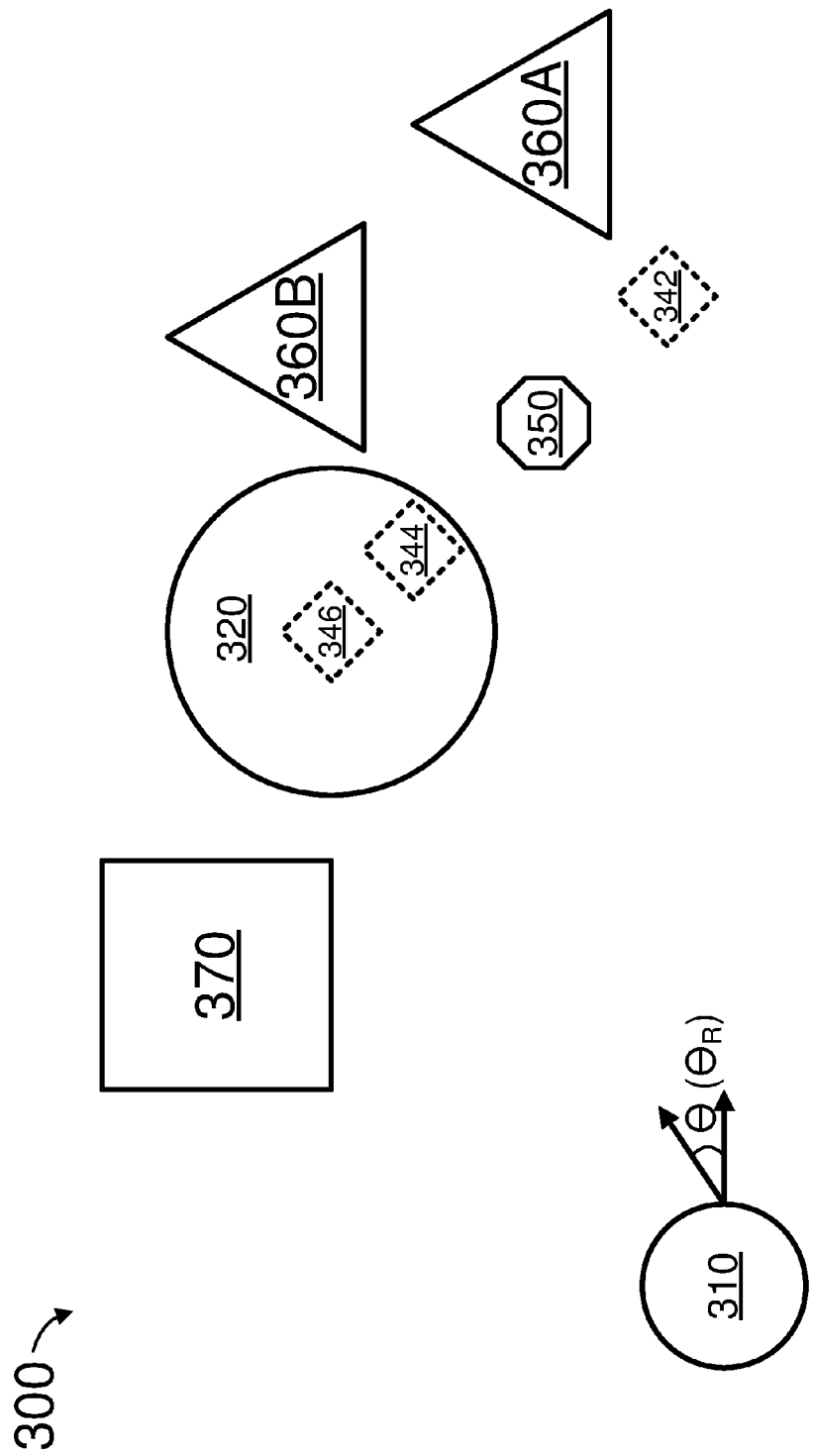

FIG. 3B depicts another view of environment 300, in accordance with various embodiments. Environment 300 can include user 310 and point of interest (POI) 320 as described above in relation to FIG. 3A. Locations (e.g., points, areas, positions, and the like) 342-346 can indicate where user 310 is (possibly) looking in environment 300. Location 342 is outside of POI 320. Location 344 is inside (or on) POI 320, but not in the center of POI 320. Location 346 is inside (or on) the center of POI 320. Indicator (or cursor) 350 is provided to user 310 (e.g., using HMD 132 in FIG. 1, display 220 in FIG. 2, and the like) and denotes where user 310 is looking (or gazing) in environment 300 at a particular time. For example, when user 310 is looking at location 342, indicator 350 is displayed/superimposed over/on location 342. Indicator 350 can be, for example, a (animated) solid dot, a circle having a (semi-) transparent center, other shapes, reticle (e.g., cross hairs), and the like.

When user 310 is looking (or gazing) at location 342, indicator 350 can be in a default state (e.g., represented using a default image, color, animation, and the like). Alternatively or additionally, when location 342 is a predetermined distance from POI 320, guidance 360A (e.g., for directing the gaze of user 310) can be provided. For example, guidance 360A can be (two-dimensional and/or three-dimensional) text, flow lines (or other (animated) graphics), audio (e.g., harmonic sounds described further below), and the like. In various embodiments, no effect (e.g., text, (animated) graphics, sound, etc.) is provided when user 310 is looking at location 342.

In some embodiments, indicator (or cursor) 350 can automatically aim at POI 320. For example, indicator 350 can move (directly) to POI 320 when the user's gaze (and indicator 350) is within a certain radius/proximity (e.g., at location 344) of a center of POI 320 (e.g., location 346). Indicator 350 can move directly to the center of POI 320 when it is within a certain distance from the center, such as a predefined distance of a function of two-dimensional and/or three-dimensional element parameters (e.g., radius, etc.). In this way, user 310 can (quickly) move indicator 350 to (or through) POI 320, such that indicator 350 will move to (and stop at) the center of POI 320 (e.g., location 346), rather than pass through and/or overshoot POI 320.

When user 310 is looking (or gazing) at location 344, indicator (or cursor) 350 can change from the default state (e.g., to direct the gaze of user 310 toward the center of POI 320 (e.g., location 346)). For example, a color (e.g., darker color to lighter color, and vice-versa), animation, frequency of animation (e.g., movement, such as spinning, faster or slower), size (e.g., shrinks or grows), graphic/image, and the like associated with indicator 350 changes. In some embodiments, the change in indicator 350 can be a function of a distance of location 344 from the center of POI 320 (e.g., location 346). For example, indicator 350 spins faster as the gaze of user 310 moves toward location 346, indicator 350 spins slower as the gaze of user 310 moves away from location 346, and vice-versa. Alternatively or additionally, guidance 360B (e.g., for directing the gaze of user 310) can be provided when user 310 is looking (or gazing) at location 344. For example, guidance 360B can be (two-dimensional and/or three-dimensional) text, flow lines (or other (animated) graphics), audio (e.g., harmonic sounds described further below), and the like.

When user 310 is looking (or gazing) at location 346, indicator (or cursor) 350 can change. For example, a color (e.g., darker color to lighter color, and vice-versa), animation, frequency of animation (e.g., moves, such as spinning, faster or slower), size (e.g., shrinks or grows), graphic/image, and the like associated with indicator 350 changes. In some embodiments, the change in indicator 350 can be at the end of a range. For example, indicator 350 is a darkest/lightest color, fastest/slowest animation, and the like compared to a state of indicator 350 when user 310 is looking at location 344. Alternatively or additionally, POI 320 can activate when user 310 is looking at location 346. In some embodiments, activation can be changing POI 320 and/or providing information 370. For example, a color (e.g., darker color to lighter color, and vice-versa), animation, frequency of animation (e.g., moves, such as spinning, faster or slower), size (e.g., shrinks or grows), graphic/image, and the like associated with POI 320 changes. Information 370 can be (two-dimensional and/or three-dimensional) text, audio, and video intended to provide description, explanation, facts, statistics, and the like (e.g., associated with POI 320 and/or environment 300) to user 310.

Figure 4:
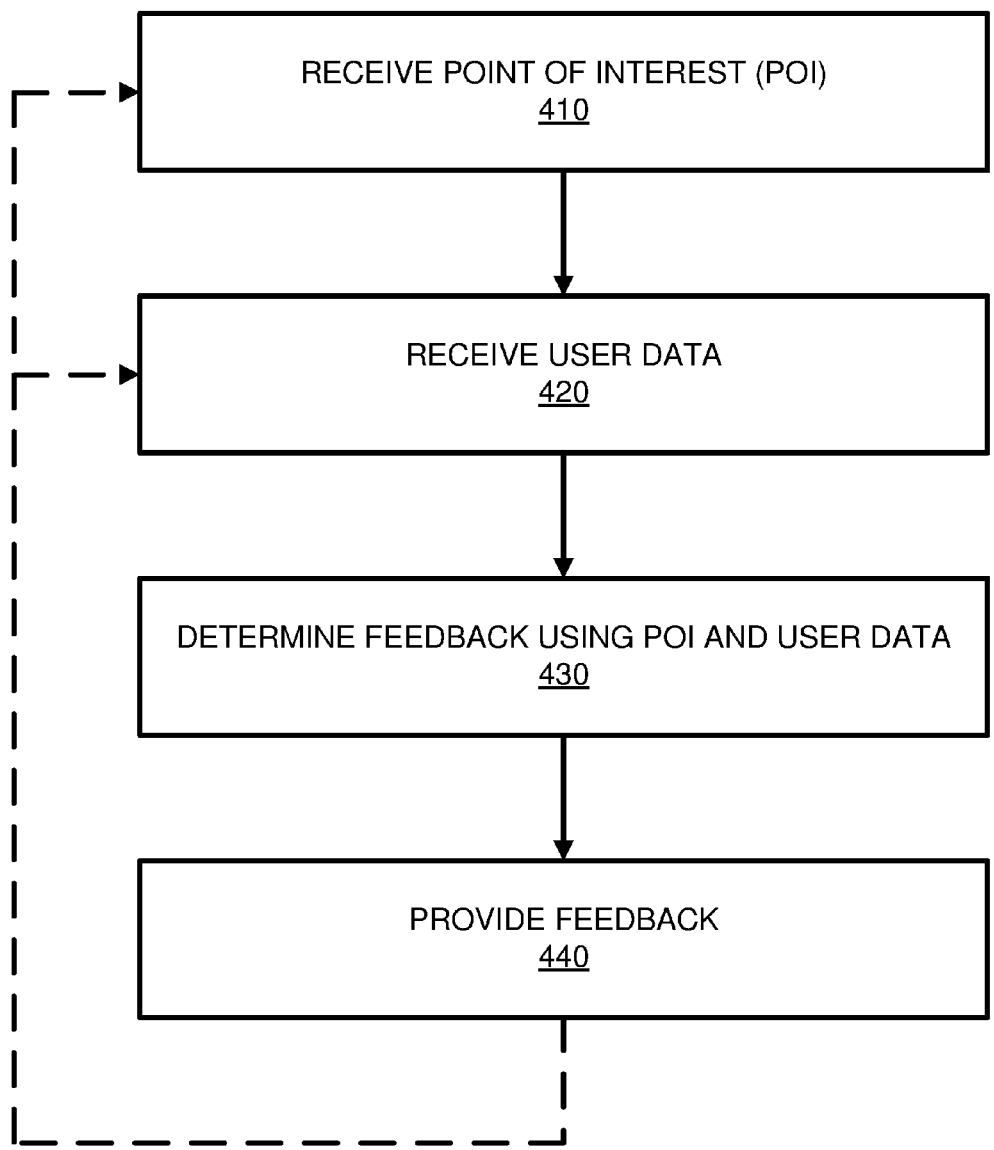
FIG. 4 is simplified flow diagram of a method for providing an intentional user experience in accordance with various embodiments.

FIG. 4 depicts method (or process) 400 for providing an intentional user experience, according to some embodiments. Method 400 can be performed at least in part by system 100 (FIG. 1), system 200 (FIG. 2), computing system 700 (FIG. 7), and the like, individually or in combinations and permutations thereof.

At step 410, (data such as location, identification, and the like of) a POI can be received. The POI can have at least some of the features of POI 320 in FIGS. 3A and 3B. In some embodiments, a POI is various combinations and permutations of a physical or virtual location, object, and entity. For example, a POI can be a virtual direction, user-interface element (e.g., graphical control element and/or visual widget, such as a button and scroll bar), an object, and an entity toward which the user should look and/or move, and the like. In some embodiments, identification includes a name, file name, characteristics or attributes such as appearance (e.g., associated 2-dimensional and/or 3-dimensional image, animation, etc.), behavior, location (e.g., coordinates), and the like.

At step 420, user data can be received. User data can be sensor measurements associated with the user (e.g., user 110 in FIG. 1 and/or user 310 in FIGS. 3A and 3B). For example, sensor measurements from headset 130, user input device 140 (FIG. 1), and/or mobile computing device 210 are received and used to identify or determine a location of the user and/or POI. For example, sensor measurements indicate (or are used to determine) a spatial relationship and/or orientation between the user and the POI (e.g., d and θ in FIG. 3A). By way of further non-limiting example, sensor measurements indicate (or are used to determine) where the user is looking. User data can additionally or alternatively be received (e.g., streamed) from a server.

At step 430, feedback to be provided as sensory output to the user can be determined. Sensory output to the user can be directed to the senses of sight, hearing, touch, smell, and taste, singly and in combination. As was described in relation to FIG. 3B and will be described in relation to FIG. 5, the feedback can be used to subtly direct the user to take certain action (e.g., move and/or look toward POI 320 in FIGS. 3A and 3B). For example, feedback includes changing indicator 350 (FIG. 3B), providing guidance 360A or 360B, and the like. Additionally or alternatively, feedback can provide sensory cues to help the user distinguish two or more POIs from each other (e.g., a different sound, color, and the like can be provided for each POI).

At step 440, the feedback can be provided as sensory output to the user, for example, by provided visual information (e.g., using head-mounted display (HMD) 132 (FIG. 1), display 220 of mobile computing device 210 (FIG. 2), and the like), and audio information (e.g., using stereo transducers 134 (FIG. 1) and speakers of mobile computing device 210, and the like).

Method 400 can continue to step 410 or 420 after step 440.

Figure 5:
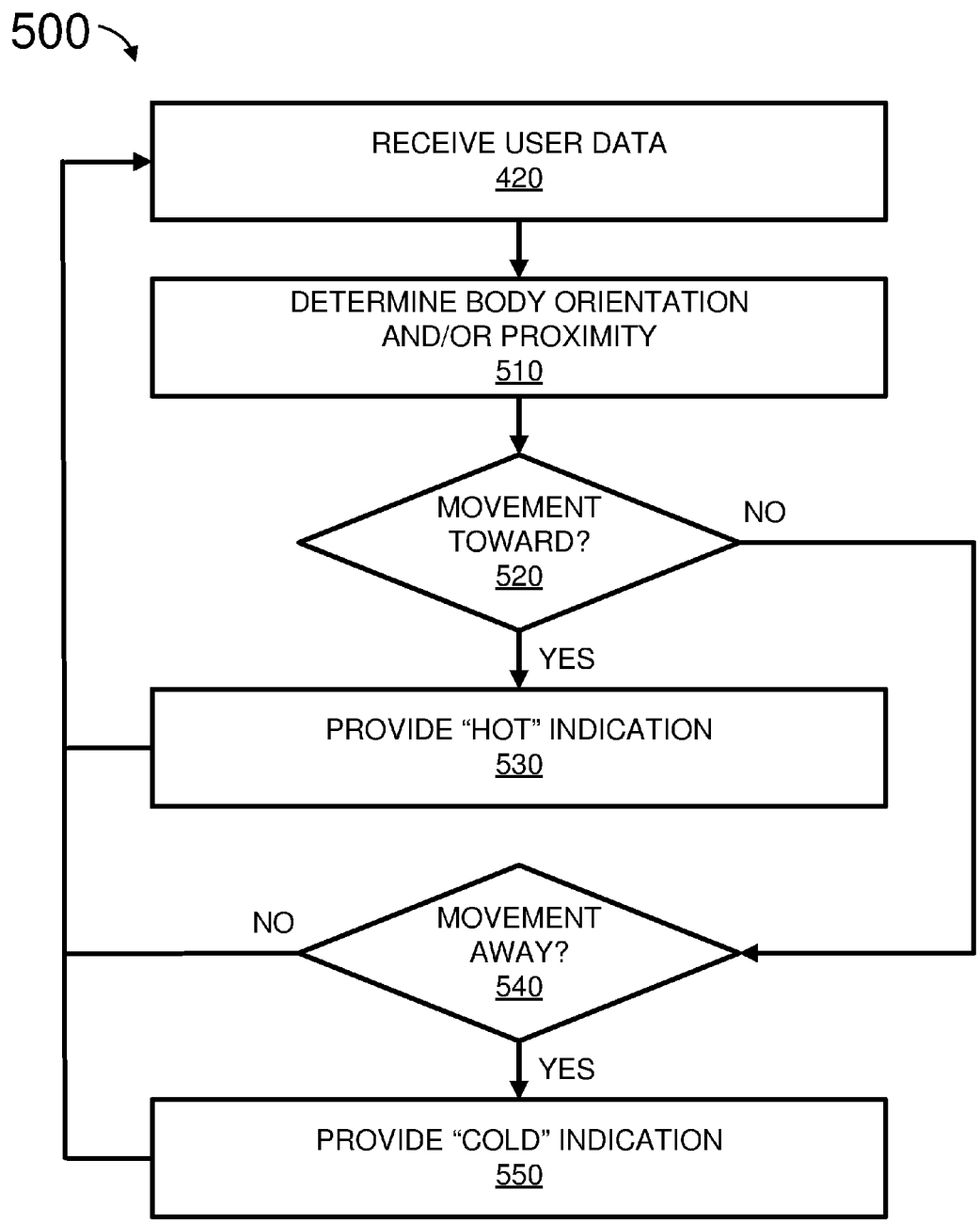
FIG. 5 is a simplified flow diagram of a method for providing feedback, according to some embodiments.

FIG. 5 depicts method (or process) 500 for providing harmonic feedback according to some embodiments. Method 500 can be performed at least in part by various combinations and permutations of system 100 (FIG. 1), system 200 (FIG. 2), computing system 700 (FIG. 7), and the like. Method 500 may commence after step 420 of method 400 (described above in relation to FIG. 4).

At step 510, an orientation of a user and/or distance of a user (e.g., user location) relative to the POI are determined using the user data and POI. For example, the orientation of a user is a (relative) direction of the user's gaze (e.g., e in FIGS. 3A and 3B), such as determined from user data (e.g., step 420 in FIG. 4). By way of further non-limiting example, the distance of the user relative to the POI is the distance between user 310 (FIG. 3A) and POI 320, such as distance d. In some embodiments, POI is a user interface element, virtual location, object, and entity, singly and in combination.

At step 520, a desired change of the orientation (e.g., angle) and/or distance of user 110 (FIG. 1) relative to the POI is checked. In some embodiments, the desired change denotes moving closer to (or away from) and/or looking at (or away from) the POI. In response to the desired change, method 500 proceeds to step 530. When the desired change did not occur, method 500 proceeds to step 540.

At step 530, a "hot" indication is provided to the user. In some embodiments, the "hot" indication denotes the user made a desirable change (e.g., in orientation (e.g., angle) and/or distance of user 110 (FIG. 1) relative to the POI changed in a desired manner). For example, the user's gaze changed from a less-desirable orientation to a more-desirable orientation. By way of further non-limiting example, the user's location changed from far away to close by (or vice-versa).

In some embodiments, the "hot" indication includes providing a sound (e.g., using stereo transducers 134 (FIG. 1) and speakers of mobile computing device 210, and the like). For example, a higher harmonic tone can be added to a tone associated with a current orientation (e.g., angle) and/or distance of user 110 (FIG. 1) relative to the POI. By way of further non-limiting example, a series of higher harmonic tones can be provided as the user moves and/or looks toward the POI. The harmonic tone(s) can be from a harmonic series where the base frequency of each sound in the harmonic series is an integral multiple of the lowest base frequency.

Alternatively or additionally, the "hot" indication includes providing visual feedback (e.g., using head-mounted display (HMD) 132 (FIG. 1), display 220 of mobile computing device 210 (FIG. 2), and the like). For example, the visual feedback can include combinations and permutations of flow lines in a direction toward the POI, sparkles moving in a direction toward the POI, color of the POI itself, color of a shadow of the POI, and the like. As the user moves in a desired manner, a density of flow lines and/or sparkles can increase.

At step 540, an undesired change of the orientation (e.g., angle) and/or distance of user 110 (FIG. 1) relative to the POI is checked. In response to the undesired change, method 500 proceeds to step 550. When the undesired change did not occur, method 500 proceeds to step 530.

At step 550, a "cold" indication is provided to the user. In some embodiments, the "cold" indication denotes the user made an undesirable change (e.g., orientation (e.g., angle) and/or distance of user 110 (FIG. 1) relative to the POI changed in an undesirable manner). For example, the user's gaze changed from looking toward the POI to looking away from the POI (or vice-versa). By way of further non-limiting example, the user's location changed from close by to far away (or vice-versa).

In some embodiments, the "cold" indication includes providing a sound (e.g., using stereo transducers 134 (FIG. 1) and speakers of mobile computing device 210, and the like). For example, the higher harmonic tone(s) (e.g., added when the user made a desirable change) can be removed from a tone associated with a current orientation (e.g., angle) and/or distance of user 110 (FIG. 1) relative to the POI. By way of further non-limiting example, when more than one harmonic tone was added (e.g., as the user made a desirable change) the added harmonic tones can be removed in reverse order (e.g., most recently added harmonic tone is removed first and so on).

Alternatively or additionally, the "cold" indication includes providing visual feedback (e.g., using head-mounted display (HMD) 132 (FIG. 1), display 220 of mobile computing device 210 (FIG. 2), and the like). For example, the visual feedback can include various combinations and permutations of: flow lines in a direction toward the POI and sparkles moving in a direction toward the POI. When the user moves in an undesired manner, a density of flow lines and/or sparkles can decrease.

Figure 6:
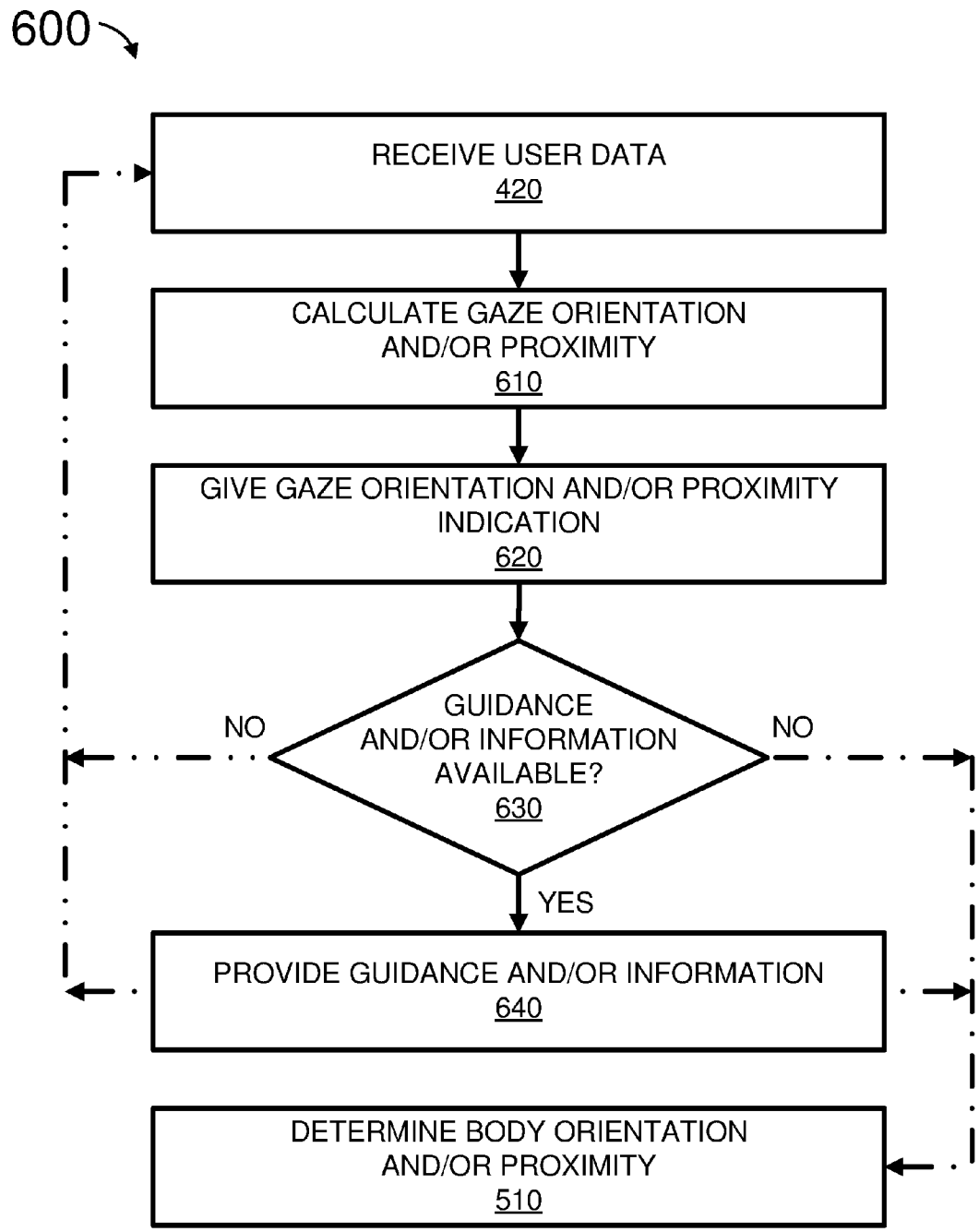
FIG. 6 is a simplified flow diagram of a method for gaze assist, according to various embodiments.

FIG. 6 depicts method (or process) 600 for directing a user's gaze in accordance with some embodiments. The steps of method 600 can be performed additionally and/or alternatively to the steps of method 400 (FIG. 4) and method 500 (FIG. 5). Method 600 can be performed at least in part by various combinations and permutations of system 100 (FIG. 1), system 200 (FIG. 2), computing system 700 (FIG. 7), and the like. Method 600 may commence after step 420 of method 400 (FIG. 4).

At step 610, an orientation of a user's gaze and/or distance of a user's gaze relative to the POI (e.g., where the user is looking or user gaze location) are determined using the user data and POI data. For example, the orientation of a user's gaze is a (relative) direction of the user's gaze (e.g., e in FIGS. 3A and 3B), such as determined from user data (e.g., step 420 in FIG. 4). By way of further non-limiting example, the distance of a user's gaze relative to the POI is the distance between indicator 350 (FIG. 3B), which denotes where the user is looking, and POI 320. In some embodiments, POI is a user interface element, virtual location, object, and entity, singly and in combination.

At step 620, an indication of where the user is looking is given. In some embodiments, indicator 350 is generated using orientation of a user's gaze and/or distance of a user's gaze relative to the POI (e.g., where the user is looking). Indicator 350 can vary depending on how far the user's gaze is from the center of POI 320 (FIG. 3B). For example, a color (e.g., darker color to lighter color, and vice-versa), animation, frequency of animation (e.g., movement, such as spinning, faster or slower), size (e.g., shrinks or grows), graphic/image, and the like associated with indicator 350 changes. Indicator 350 can be provided to user 310 using HMD 132 in FIG. 1, display 220 in FIG. 2, and the like and denotes where user 310 is looking (or gazing) in environment 300. For example, when user 310 is looking at a particular location, indicator 350 is displayed/superimposed over/on the location. In various embodiments, step 620 is performed concurrently with step 510 (FIG. 5).

At step 630, a check for guidance and/or information—associated with the location the user is looking at—can be performed. In some embodiments, orientation of a user's gaze and/or distance of a user's gaze relative to the POI (e.g., where the user is looking) is used to retrieve available guidance and/or information. For example, guidance 360A or 360B (FIG. 3B) can be (two-dimensional and/or three-dimensional) text, flow lines (or other (animated) graphics), audio (e.g., harmonic tone(s) described above), and the like. By way of further non-limiting example, guidance 360A or 360B (FIG. 3B) can include a "hot" indication and/or "cold" indication (e.g., as described above) using the movement of the user's gaze toward or away from POI 320. By way of additional non-limiting example, information 370 can be (two-dimensional and/or three-dimensional) text, audio, and video intended to provide description, explanation, facts, statistics, and the like (e.g., associated with POI 320 and/or environment 300) to user 310 (FIG. 3B).

A particular guidance and/or information can be provided to the user when the user's gaze falls upon the POI (e.g., the user is looking at POI 320 in FIG. 3B). In some embodiments, particular sounds (e.g., completion tones) can be provided to the user when the user's gaze falls upon the POI. Guidance and/or information (e.g., visual information such speed, size, etc. of indicator 350; auditory information such as tones, pitches, etc. provided to the user, and the like) can vary over a continuum (e.g., response scale), where a minimum end of the continuum is provided when the user is furthest away from the point of interest and a maximum end is provided when the user is at the point of interest.

In various embodiments, as the user looks toward the POI, an indicator (e.g., indicator 350 in FIG. 3) visibly changes and auditory information changes (as described above) along a continuum. When the user's gaze falls upon the POI, the guidance and/or information (e.g., visual and auditory reactivity) can reach a maximum end of a response scale and an activation can be triggered. According to various embodiments, the user looking at the POI can be a proxy for the user taking/making an (real and/or virtual) action (e.g., analogous to a mouse click in a graphical user interface) triggering the activation. The activation can include providing additional information (e.g., visual cues, auditory cues, etc. associated with taking or completion of the (real and/or virtual) action). For example, the activation includes providing a signal denoting acknowledgment and/or receipt of the completion of the activation (e.g., a completed mouse click). In this way, guidance and/or information can be on a graded scale with additional auditory and/or visual cues to confirm a gaze-based activation (e.g., an auditory cue for a successful gaze-based double click and/or a visual cue for a successful gaze-based double click).

When guidance and/or information—associated with the location the user is looking at—is not available, method 600 optionally continues to step 420 (e.g., as described in relation to method 400 of FIG. 4, method 500 of FIG. 5, and/or method 600), according to some embodiments. In various embodiments, method 600 optionally continues to step 510 (FIG. 5). When step 510 is performed concurrently with step 610, method 600 can optionally continue to step 520 (FIG. 5).

At step 640 the retrieved guidance and/or information can be provided. In some embodiments, method 600 optionally proceeds to step 420 (e.g., as described in relation to method 400 of FIG. 4, method 500 of FIG. 5, and/or method 600). In various embodiments, method 600 optionally continues to step 510 (FIG. 5). When step 510 is performed concurrently with step 610, method 600 can optionally continue to step 520 (FIG. 5).

For clarity, descriptions of the present technology were described in relation to a single user (e.g., user 310 in FIG. 3B), however the techniques described herein may be used with more than one user. For example, two users work together by observing with the passive user interface elements and arriving at the same point/volume/region of interest. Multiple users' gaze feedback/location information can be received and collective feedback can be provided to the group based on any one participant. For example, one user sees a cursor display a cold signal when a team member is moving cold, communicates with the team member to seek a hot signal and move in a desired direction, in a collaborative feedback system with multiple parties, or one user able to view the feedback systems of another user. In this way, groups of people can coordinate to move to points or objects of interest, using either individual feedback or group feedback. At large distances, user data can be received from a server, where multiple users upload their data, a backend performs intensive backend operations, and data streamed down is slightly different, providing for this feedback.

Figure 7:
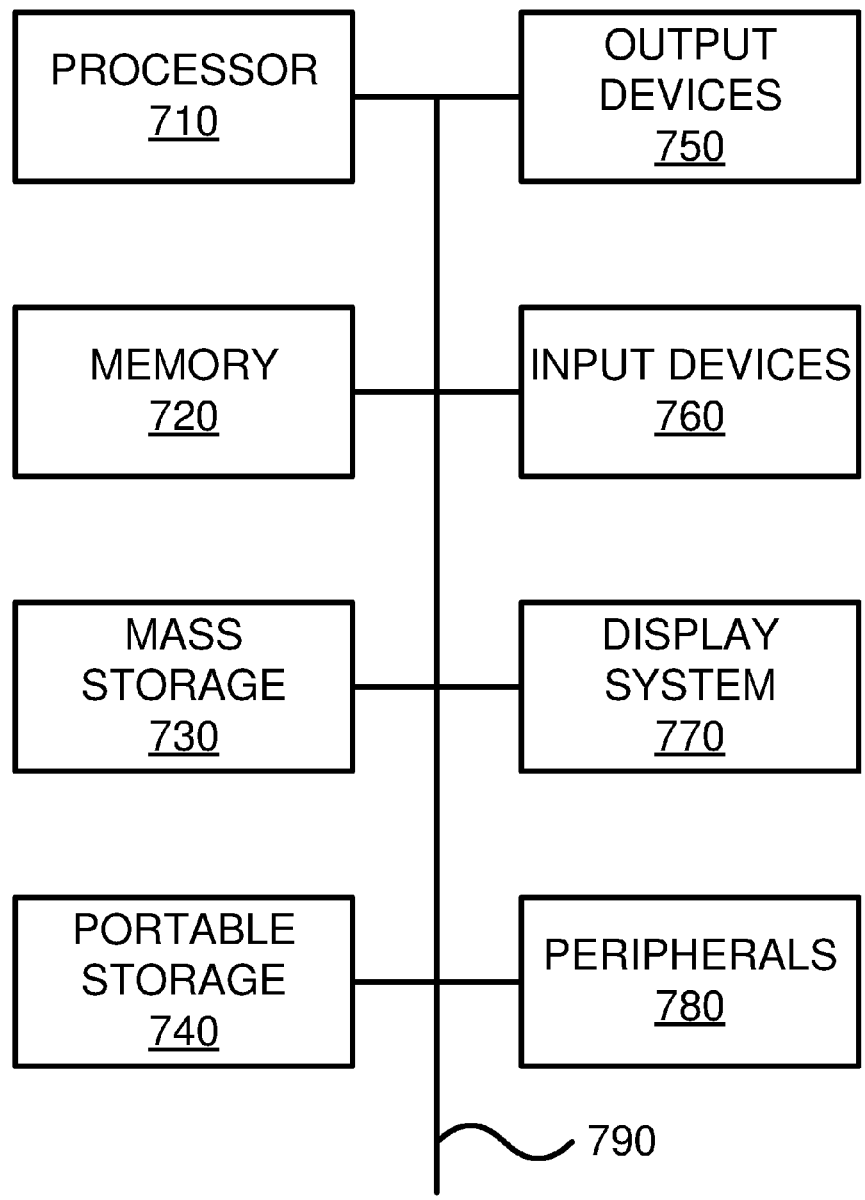
FIG. 7 is simplified block diagram of a computing system, in accordance with some embodiments.

FIG. 7 illustrates an exemplary computer system 700 that may be used to implement some embodiments of the present invention. The computer system 700 in FIG. 7 may be implemented in the contexts of the likes of computing systems, networks, servers, or combinations thereof. The computer system 700 in FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

The components provided in the computer system 700 in FIG. 7 are those typically found in computer systems that may be suitable for use with embodiments of the present disclosure and are intended to represent a broad category of such computer components that are well known in the art. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, WebVR, FirefoxOS, ChromeOS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 700 may be implemented as a cloud-based computing environment, such as a virtual machine operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Alternatively or additionally, the remote computer may be connected to the user's computer using pairing, such as Wi-Fi Direct, Bluetooth, Bluetooth low energy, and the like.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for providing sensory cues to a user of an augmented reality device comprising:
    getting point of interest data, including a location of a point of interest in a real space;
    receiving first user data, including a first location of the user in the real space, the first user data provided by at least one sensor of the augmented reality device, the first location of the user in the real space comprising first Cartesian coordinates;
    calculating a first direction from the first location of the user in the real space to the location of the point of interest;
    displaying a first indicator denoting the first direction;
    receiving second user data, including a second location of the user in the real space, the second user data provided by the at least one sensor of the augmented reality device, the second location of the user in the real space comprising second Cartesian coordinates;
    calculating a second direction from the second location of the user in the real space to the location of the point of interest;
    determining the second location of the user is closer to the location of the point of interest than the first location of the user;
    displaying a second indicator denoting the second direction and using the second location, such that the second indicator is at least one of larger or smaller than the first indicator, moving at a higher or lower frequency than the first indicator, and having a brighter or darker color than the first indicator;
    receiving third user data, including a third location of the user in the real space, the third user data provided by the at least one sensor of the augmented reality device, the third location of the user in the real space comprising third Cartesian coordinates;
    calculating a third direction from the third location of the user in the real space to the location of the point of interest;
    determining the third location of the user is closer to the location of the point of interest than the second location of the user; and
    displaying a third indicator denoting the third direction and using the third location, such that the third indicator is at least one of larger or smaller than the second indicator, moving at a higher or lower frequency than the second indicator, and having a brighter or darker color than the second indicator.

2. The method of claim 1, wherein:
    the first indicator includes a first tone;
    the second indicator includes a second tone;
    the third indicator includes a third tone;
    a frequency of the second tone is an integral multiple of a frequency of the first tone; and a frequency of the third tone is an integral multiple of the frequency of the second tone.

3. The method of claim 2 further comprising:
providing a fourth indicator when a location of the user in the real space falls within a predetermined distance from the point of interest, the fourth indicator being displayed at a center of the point of interest, the fourth indicator being at least one of larger or smaller than the first, second, and third indicators, moving at a higher or lower frequency than the first, second, and third indicators, and having a brighter or darker color than the first, second, and third indicators, the fourth indicator including a fourth tone, a frequency of the fourth tone being an integral multiple of the frequency of the first, second, and third tones.

4. The method of claim 1, wherein at least one of the first indicator, second indicator, and third indicator includes flow lines denoting the first direction, second direction, and third direction, respectively.

5. The method of claim 1, wherein:
the point of interest includes at least one of a real person, a real object, a virtual person, a virtual object, and a user-interface element.

6. The method of claim 1, wherein:
the augmented reality device includes at least one of a virtual-reality headset, a smartphone, a gamepad, a joystick, a keyboard, a keypad, and a glove controller; and
the at least one sensor of the augmented reality device is at least one of an accelerometer, a gyroscope, an eye-tracking device, and a Global Positioning System.

7. The method of claim 1, wherein at least some of the first user data, the second user data, and the third user data is received from a server.

8. The method of claim 1, wherein the first indicator, the second indicator, and the third indicator are provided using a display of the augmented reality device.

9. The method of claim 1, wherein the location of the point of interest, the first location of the user, the second location of the user, and the third location of the user each include at least one of Cartesian coordinates, Global Positioning System coordinates, and vectors.

10. The method of claim 1, wherein at least one of the first indicator, second indicator, and third indicator includes haptic feedback, the haptic feedback provided using the augmented reality device including at least one of a virtual-reality headset, a smartphone, a gamepad, a joystick, a keyboard, a keypad, and a glove controller.

11. A computer-implemented method for providing sensory cues to a user of an augmented reality device comprising:
getting point of interest data, including a location of a point of interest in a real space;
receiving first user data, including a first location of the user in the real space, the first user data provided by at least one sensor of the augmented reality device, the first location of the user in the real space comprising first Cartesian coordinates;
receiving second user data, including a second location of the user in the real space, the second user data provided by the at least one sensor of the augmented reality device, the second location of the user in the real space comprising second Cartesian coordinates;
providing a hot indication when the second location of the user is spatially closer to the location of the point of interest than the first location of the user;
providing a cold indication when the first location the user is spatially closer to the location of the point of interest than the second location of the user;
receiving third user data, including a third location of the user in the real space, the third user data provided by the at least one sensor of the augmented reality device, the third location of the user in the real space comprising third Cartesian coordinates;
providing a hot indication when the third location of the user is spatially closer to the location of the point of interest than the second location of the user; and
providing a cold indication when the second location of the user is spatially closer to the location of the point of interest than the third location of the user.

12. The method of claim 11, wherein:
the hot indication is at least one of larger or smaller than the cold indication, moving at a higher or lower frequency than the cold indication, and having a brighter or darker color than the cold indication.

13. The method of claim 12, wherein:
the cold indication includes a first tone;
the hot indication includes a second tone; and
a frequency of the second tone is an integral multiple of a frequency of the first tone.

14. The method of claim 13 further comprising:
providing an arrival indication when a location of the user in the real space falls within a predetermined distance from the point of interest, the arrival indication being displayed at a center of the point of interest, the arrival indication being at least one of larger or smaller than the cold and hot indications, moving at a higher or lower frequency than the cold and hot indications, and having a brighter or darker color than the cold and hot indications, the arrival indication including a third tone, a frequency of the third tone being an integral multiple of the frequency of the first and second tones.

15. The method of claim 12, further comprising:
producing flow lines using the first location of the user and the location of the point of interest, the flow lines indicating a direction from the first location of the user to the location of the point of interest; and
displaying the flow lines.

16. The method of claim 11, wherein:
the point of interest includes at least one of a real person, a real object, a virtual person, a virtual object, and a user-interface element.

17. The method of claim 11, wherein:
the augmented reality device includes at least one of a virtual-reality headset and a smartphone; and
the at least one sensor of the augmented reality device is at least one of an accelerometer, a gyroscope, an eye-tracking device, and a Global Positioning System.

18. The method of claim 11, wherein at least some of the first user data, the second user data, and the third user data is received from a server.

19. The method of claim 11, wherein the hot indication and the cold indication are provided using at least one of a transducer and a display of the augmented reality device.

20. The method of claim 11, wherein the location of the point of interest, the first location of the user, the second location of the user, and the third location of the user each include at least one of Cartesian coordinates, Global Positioning System coordinates, and vectors.

21. A non-transitory computer-readable storage medium having embodied thereon a program, the program being executable by a processor to perform a method for providing sensory cues to a user of an augmented reality device, the method comprising:

getting point of interest data, including a location of a point of interest in a real space;

receiving first user data, including a first location of the user in the real space, the first user data provided by at least one sensor of the augmented reality device, the first location of the user in the real space comprising first Cartesian coordinates;

calculating a first direction from the first location of the user in the real space to the location of the point of interest;

displaying a first indicator denoting the first direction;

receiving second user data, including a second location of the user in the real space, the second user data provided by the at least one sensor of the augmented reality device, the second location of the user in the real space comprising second Cartesian coordinates;

calculating a second direction from the second location of the user in the real space to the location of the point of interest;

determining the second location of the user is closer to the location of the point of interest than the first location of the user;

displaying a second indicator denoting the second direction and using the second location, such that the second indicator is at least one of larger or smaller than the first indicator, moving at a higher or lower frequency than the first indicator, and having a brighter or darker color than the first indicator;

receiving third user data, including a third location of the user in the real space, the third user data provided by the at least one sensor of the augmented reality device, the third location of the user in the real space comprising third Cartesian coordinates;

calculating a third direction from the third location of the user in the real space to the location of the point of interest;

determining the third location of the user is closer to the location of the point of interest than the second location of the user; and displaying a third indicator denoting the third direction and using the third location, such that the third indicator is at least one of larger or smaller than the second indicator, moving at a higher or lower frequency than the second indicator, and having a brighter or darker color than the second indicator.

* * * * *